US012623162B2

(12) United States Patent
McIntyre

(10) Patent No.: US 12,623,162 B2
(45) **Date of Patent: *May 12, 2026**

(54) SYSTEM AND METHOD FOR REMOVING DRILLING FLUID FROM DRILL CUTTINGS USING DIRECT HEAT

(71) Applicant: Elavo Energy Solutions Ltd., Calgary (CA)

(72) Inventor: Barry McIntyre, Calgary (CA)

(73) Assignee: Elavo Energy Solutions Ltd., Calgary (CA)

( * ) Notice: Subject to any disclaimer, the term of this patent is extended or adjusted under 35 U.S.C. 154(b) by 1050 days.

This patent is subject to a terminal disclaimer.

(21) Appl. No.: 17/755,397

(22) PCT Filed: Nov. 18, 2020

(86) PCT No.: PCT/CA2020/051567
§ 371 (c)(1),
(2) Date: Apr. 28, 2022

(87) PCT Pub. No.: WO2021/097564
PCT Pub. Date: May 27, 2021

(65) Prior Publication Data
US 2022/0389778 A1 Dec. 8, 2022

Related U.S. Application Data

(60) Provisional application No. 62/939,345, filed on Nov. 22, 2019.

(51) Int. Cl.
*E21B 21/06* (2006.01)
*B01D 1/00* (2006.01)
(Continued)

(52) U.S. Cl.
CPC .......... *E21B 21/066* (2013.01); *B01D 1/0058* (2013.01); *B01D 1/0082* (2013.01); *B01D 1/14* (2013.01); *B01D 5/006* (2013.01)

(58) Field of Classification Search
CPC ...... B01D 1/14; B01D 1/0058; B01D 1/0082; B01D 5/006; B01D 53/002;
(Continued)

(56) References Cited

U.S. PATENT DOCUMENTS 3,232,885 A 2/1966 Henke
3,241,248 A 3/1966 Gerlach et al.
(Continued)

FOREIGN PATENT DOCUMENTS

CN 109538139 A 3/2019
EP 1153197 B1 4/2004
WO WO-2014/171839 A1 10/2014

OTHER PUBLICATIONS

Communication Pursuant to Article 94 (3) EPC for European Patent Application No. 20889537.5, dated Nov. 28, 2023, (8 pages), European Patent Office, Netherlands.
(Continued)

*Primary Examiner* — David J Laux
(74) *Attorney, Agent, or Firm* — Alston & Bird LLP

(57) ABSTRACT

Systems and methods for removing drilling fluid from wet drill cuttings are described. According to some embodiments, the method comprises, at a pressure above atmospheric pressure: combusting a rich air-fuel mixture at a rich combustion temperature, thereby producing a generally low oxygen, inert rich exhaust; providing said rich exhaust to the wet drill cuttings to contact and directly heat the wet drill cuttings by convection so that at least a portion of the drilling fluid is evaporated therefrom and at least some dry solid drill cuttings remain; condensing at least a portion of
(Continued)

the evaporated drilling fluid to produce condensed drilling fluid; and separately recovering the condensed drilling fluid and the dry solid drill cuttings.

17 Claims, 13 Drawing Sheets

(51) Int. Cl.
   *B01D 1/14*          (2006.01)
   *B01D 5/00*          (2006.01)
(58) Field of Classification Search
   CPC ...... B01D 2257/702; B01D 2258/0283; E21B 21/066; E21B 21/063; F26B 21/14; F26B 23/02
   See application file for complete search history.

(56)                   References Cited

U.S. PATENT DOCUMENTS

| | | | |
|---|---|---|---|
| 3,538,614 A | | 11/1970 | Weimer et al. |
| 4,139,462 A | | 2/1979 | Sample, Jr. |
| 4,208,285 A | | 6/1980 | Sample, Jr. |
| 4,222,988 A | | 9/1980 | Barthel |
| 4,304,609 A | | 12/1981 | Morris |
| 4,387,514 A | | 6/1983 | McCaskill, Jr. |
| 4,725,362 A | * | 2/1988 | Dugat ........................ F23G 7/05 |
| | | | 210/769 |
| 5,090,498 A | * | 2/1992 | Hamill ................... B01D 36/04 |
| | | | 175/207 |
| 5,882,381 A | * | 3/1999 | Hauck .................. B01D 53/002 |
| | | | 96/123 |
| 6,530,438 B1 | * | 3/2003 | McIntyre .............. E21B 21/065 |
| | | | 175/207 |
| 6,695,077 B2 | * | 2/2004 | Szymocha ................ B09B 3/40 |
| | | | 134/25.1 |
| 6,722,436 B2 | | 4/2004 | Krill |
| 7,306,057 B2 | | 12/2007 | Strong et al. |
| 7,337,860 B2 | | 3/2008 | McIntyre |
| 8,074,738 B2 | | 12/2011 | McDonald et al. |
| 8,158,000 B2 | | 4/2012 | Newman et al. |
| 8,356,678 B2 | | 1/2013 | Perez-Cordova |
| 8,607,894 B2 | | 12/2013 | McDonald et al. |
| 8,641,895 B2 | | 2/2014 | Perez-Cordova |
| 8,728,281 B2 | | 5/2014 | Browne et al. |
| 8,820,438 B2 | | 9/2014 | Ross et al. |
| 9,073,104 B2 | | 7/2015 | Burnett et al. |
| 9,334,449 B2 | | 5/2016 | Perez-Cordova |
| 9,364,877 B2 | | 6/2016 | Brady |
| 9,370,809 B2 | | 6/2016 | Brady et al. |
| 9,393,603 B2 | | 7/2016 | Brady |
| 9,636,723 B2 | | 5/2017 | Brady |
| 9,732,673 B2 | | 8/2017 | Denton et al. |
| 9,884,997 B2 | | 2/2018 | Podlipskiy |
| 9,939,197 B2 | | 4/2018 | Hoffman |
| 11,970,917 B2 | * | 4/2024 | McIntyre ............. B01D 1/0082 |

| | | | |
|---|---|---|---|
| 12,098,602 B2 | * | 9/2024 | McIntyre ................. B09B 3/40 |
| 2001/0032452 A1 | * | 10/2001 | Kamen ................... F16H 21/30 |
| | | | 60/520 |
| 2003/0136747 A1 | | 7/2003 | Wood |
| 2003/0155158 A1 | * | 8/2003 | Szymocha ............ E21B 21/066 |
| | | | 134/22.16 |
| 2005/0153844 A1 | * | 7/2005 | McIntyre ............... F26B 23/02 |
| | | | 507/100 |
| 2005/0247599 A1 | * | 11/2005 | Browne ............... E21B 21/066 |
| | | | 208/3 |
| 2005/0260111 A1 | | 11/2005 | Arrison et al. |
| 2005/0279334 A1 | * | 12/2005 | Lerner ................. F02M 31/125 |
| | | | 123/557 |
| 2005/0282097 A1 | * | 12/2005 | Carrea ................... F23C 9/006 |
| | | | 431/9 |
| 2009/0211106 A1 | * | 8/2009 | McKenzie ........... E21B 21/066 |
| | | | 34/92 |
| 2010/0038143 A1 | | 2/2010 | Burnett et al. |
| 2012/0073932 A1 | | 3/2012 | Burnett et al. |
| 2013/0092637 A1 | * | 4/2013 | Pomerleau ............... B07B 1/46 |
| | | | 210/324 |
| 2015/0153102 A1 | | 6/2015 | Burnett et al. |
| 2015/0300108 A1 | | 10/2015 | Ahuja et al. |
| 2015/0315454 A1 | | 11/2015 | Perez-Cordova |
| 2016/0326020 A1 | | 11/2016 | Kubala et al. |
| 2019/0353354 A1 | * | 11/2019 | Glanville ................ F23L 15/04 |
| 2022/0381096 A1 | | 12/2022 | McIntyre |
| 2022/0389777 A1 | | 12/2022 | McIntyre |

OTHER PUBLICATIONS

Supplementary European Search Report for European Application No. 20889702.5, dated Dec. 19, 2023, (13 pages), European Patent Office, Munich, Germany.

Communication Pursuant to Article 94 (3) EPC for European Patent Application No. 20889703.3, dated Nov. 28, 2023, (7 pages), European Patent Office, Netherlands.

International Search Report and Written Opinion for International Application No. PCT/CA2020/051566, dated Feb. 5, 2021, (12 pages), Canadian Intellectual Property Office, Quebec, Canada.

International Search Report and Written Opinion for International Application No. PCT/CA2020/051568, dated Feb. 3, 2021, (12 pages), Canadian Intellectual Property Office, Quebec, Canada.

Extended European Search Report for European Patent Application No. 20889537.5, dated Feb. 15, 2023, (8 pages), European Patent Office, Munich, Germany.

Extended European Search Report for European Patent Application No. 20889703.3, dated Feb. 15, 2023, (8 pages), European Patent Office, Munich, Germany.

International Search and Written Opinion for International Application No. PCT/CA2020/051567, dated Jan. 18, 2021, (11 pages), Canadian Intellectual Property Office, Quebec, Canada.

Communication Pursuant to Rule 164(1) EPC for European Patent Application No. 20889702.5, dated Oct. 9, 2023, (16 pages), European Patent Office, Munich, Germany.

* cited by examiner

SYSTEM AND METHOD FOR REMOVING DRILLING FLUID FROM DRILL CUTTINGS USING DIRECT HEAT

CROSS-REFERENCE TO RELATED APPLICATIONS

The present application claims priority from U.S. Provisional Patent Application No. 62/939,345 filed on Nov. 22, 2019, the contents of which are incorporated herein by reference.

FIELD

The specification relates generally to the removal of drilling fluid from wet drill cuttings generated in the drilling of oil and gas wells, and the like, and specifically to methods and systems to remove drilling fluid from wet drill cuttings using thermal techniques.

BACKGROUND

Drilling for oil and gas produces drill cuttings which are brought to ground surface in the circulating drilling fluid. The drill cuttings may be substantially separated from the drilling fluid using various combinations of shale shakers, centrifuges and mud tanks. However, some liquid or moisture remains associated with the solid "cuttings" as a surface layer and, in some cases, internally thereof. In cases where the drilling fluid is hydrocarbon-based, the cuttings usually are associated with oil, water and drilling fluid chemical additives.

Disposal of the wet cuttings is often problematic, as the associated liquids are of environmental concern. These liquids also present problems in handling and treatment. There is a well-known propensity of these cuttings to cake or form unwanted agglomerations when heated and due to mechanical handling and transport operations. This tendency is affected by the amount of liquid present and the nature of the solids and liquids, which can be quite variable.

Current methods for disposing of cuttings contaminated with drilling fluid include: hauling the cuttings to a land fill and burying them; composting; bio-remediation; thermal desorption; and combustion. The current methods focus on how to clean up the mess once drilling is terminated, rather than on how to prevent its occurrence in the first place. With most currently used methods, little, if any, of the liquids are recovered, resulting in a loss of drilling fluid. The lost fluid results in increased costs to the drilling operator, including increased disposal costs.

Thermal desorption processes are appealing for use in cleaning up cuttings associated with hydrocarbon-based drilling fluids because they can theoretically achieve a zero residual hydrocarbon level. The thermal desorption processes currently used focus on removal of the liquids after drilling is terminated, and usually involve indirect heat. It is commonly believed that using indirect heat to dry the cuttings will reduce the risk of an uncontrolled exothermic reaction between the heated air and the drilling fluids, and that direct heating would require using a heating gas supply that does not support combustion (i.e., a non-combustible heating gas supply). As a result, in processes that use direct heat, friction, rather than heated air, is typically used to generate heat for drying the cuttings (e.g., via hammermill). In addition, current processes that use direct heat are not intended to recover drilling fluid since they usually involve direct heat in conjunction with combustion of the produced drilling fluid vapour.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1A:
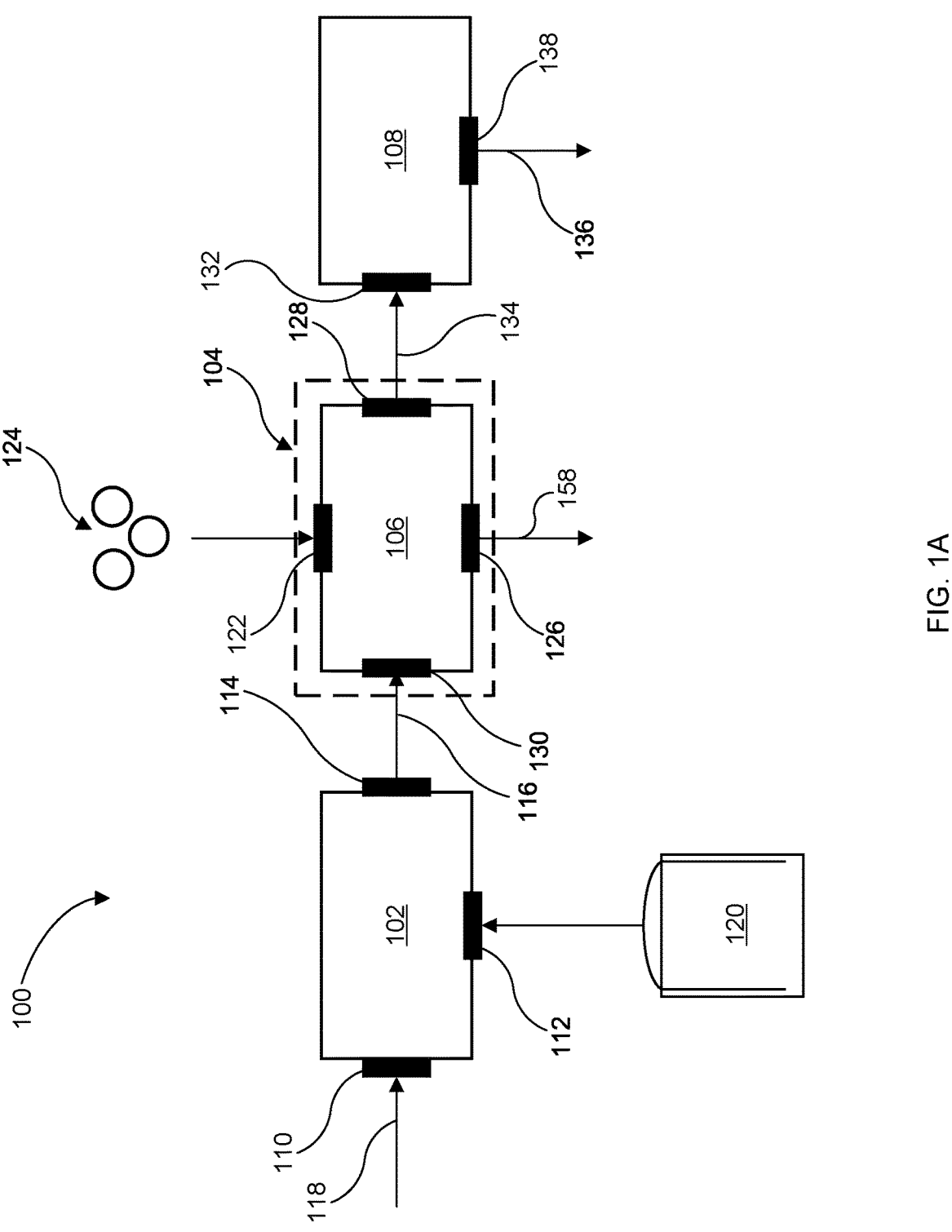
FIG. 1A depicts a system for removing drilling fluid from wet drill cuttings, according to a first set of non-limiting embodiments.

Herein described are systems and methods for removing drilling fluid from wet drill cuttings. The systems and methods provide practical and efficient means for the drying of drill cuttings generated in the drilling of oil and gas. The wet drill cuttings are directly heated using a low oxygen, generally inert gas at a temperature such that at least a portion of the drilling fluid is evaporated therefrom and at least some solid, dry drill cuttings remain. The low oxygen, generally inert gas usually comprises at least some nitrogen as a diluent. As an inert gas, the nitrogen helps reduce the potential for unwanted reactions, including uncontrolled, exothermic reactions. At least part of the low oxygen, generally inert gas is supplied by the products of a rich combustion, which may contribute at least some of the nitrogen in the low oxygen, generally inert gas. The low oxygen, generally inert gas is provided to the wet drilling cuttings so as to contact and directly heat them and is also referred to herein as the "process gas". The low oxygen content of the process gas usually allows the process gas to be provided to the wet drill cuttings at higher temperatures with a lower explosion risk of the drilling fluid than many known systems, particularly known systems that utilize a lean drying gas. The hotter combustion process usually requires less excess oxygen and does not usually increase the carbon monoxide content of the heating gas. In addition, the described methods are performed at a pressure above atmospheric pressure, rather than in a vacuum, to help prevent air from entering the system (which may introduce excess oxygen). According to some embodiments, the drying of the drill cuttings is continuous. According to some embodiments, the drying of the drill cuttings is performed as a batch process.

As stated above, the low oxygen, generally inert gas is at least partly supplied by the combustion products of a rich burn process (combustion of a rich fuel-air mixture). According to some embodiments, the rich fuel-air mixture comprises pre-heated combustion air and fuel that is added as necessary to reach a desired rich burn condition. The pre-heated combustion air can be provided through the combustion of any suitable hydrocarbon fuel, such as natural gas. The combustion air is pre-heated to a temperature that is lower than the combustion temperature of the rich fuel-air mixture.

According to some embodiments, the low oxygen, generally inert gas is supplied by a two-stage combustion process: a lean burn combustion process followed by a rich burn combustion process. The rich burn combustion process is capable of producing exhaust gas having low oxygen levels (also referred to herein as "rich exhaust"), thereby posing a reduced risk of explosion than that produced by lean burn combustion (which will have higher oxygen levels). With a lower oxygen level, the rich exhaust can be provided to the wet drill cuttings at a higher temperature than the exhaust gas of a lean burn process (also referred to herein as "lean exhaust"). The lower oxygen level of the rich exhaust may also result in lower nitrogen levels than that of lean exhaust. In terms of process efficiency, it has been found that lower oxygen levels usually result in less inert gas being heated as there will be less excess nitrogen. Generally, lower excess oxygen levels tend to result in less heat being absorbed by the heating of extra inert nitrogen which, in turn, tends to result in a higher combustion exhaust temperature. This helps achieve a higher process gas temperature, which can improve heat transfer and help minimize the overall process gas flow, subsequently reducing solids entrainment and carryover.

The described systems and methods also provide for the recovery of drilling fluids and dried solid drill cuttings. At least a portion of the evaporated drilling fluid may be condensed such that condensed drilling fluid can be separately recovered from dried solid drill cuttings.

As described further below, the described systems and methods may further comprise additional means to measure and fine tune the oxygen, nitrogen and/or carbon monoxide levels of the gas flow at various stages of the processes.

For the purposes of this application, "wet drill cuttings" include rock and biomass particles, and drilling fluid retrieved from a well drilling operation. The exact composition of the wet drill cuttings will vary from one operation to another and during an operation due to changing rock/biomass composition and drilling fluid composition. However, the wet drill cuttings can comprise, without limitation, hydrocarbons, water, shales, clays, sandstone, carbonates, drilling fluids and combinations thereof.

The terms "rich" and "lean" are also used herein. For clarity, "rich" and "lean" is used herein to denote the level of oxygen in an air-fuel mixture. A "rich air-fuel mixture" or "rich exhaust" is an air-fuel mixture having lower oxygen levels below stoichiometric. In contrast, a "lean air-fuel mixture" or "lean exhaust" is an air-fuel mixture having an excess of oxygen (oxygen level above stoichiometric). As would then be understood, "rich combustion" denotes combustion of a rich air-fuel mixture and "lean combustion" denotes combustion of a lean air-fuel mixture.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Attention is directed to FIG. 1A, which depicts an example system 100 for removing drilling fluid from wet drill cuttings, according to non-limiting embodiments. System 100 operates at a pressure above atmospheric pressure, which helps prevent air from the surrounding environment from entering the system (air which will usually contain excess oxygen). System 100 comprises a rich combustion chamber 102, a processor 104 having a processing chamber 106 and at least one condensing device 108. Rich combustion chamber 102 has at least one air inlet 110, at least one fuel inlet 112 and at least one rich exhaust outlet 114. Rich combustion chamber 102 is configured to heat a rich air-fuel mixture at a rich combustion temperature, $T_R$, thereby producing a generally low oxygen, inert rich exhaust, such as rich exhaust 116. According to some embodiments, the oxygen level of the rich air-fuel mixture is in the range of about 5% to about 10%, and, according to some embodiments, the oxygen level of the rich air-fuel mixture is up to about 20%.

Rich combustion chamber 102 comprises one or more burners to heat the rich-fuel air mixture to $T_R$. According to some embodiments, $T_R$ is in the range of about 500° C. to about 1500° C. According to some embodiments, $T_R$ is in the range of about 500° C. to about 1000° C. According to some embodiments, $T_R$ is in the range of about 500° C. to about 750° C. According to some embodiments, $T_R$ is about 720° C.

According to some embodiments, the rich air-fuel mixture comprises combustion air, such as combustion air 118, mixed with a hydrocarbon-based fuel provided to the rich combustion chamber 102, directly or indirectly, from any suitable fuel source (such as natural gas fuel source 120 or flue gas). Combustion air 118 may be supplied in any suitable manner, such as by a centrifugal or positive displacement blower (not shown).

Processing chamber 106 comprises a cuttings inlet 122, through which wet drill cuttings 124 are received into the processing chamber 106, a dry solids outlet 126, an evaporated drilling fluids outlet 128 and an exhaust inlet 130 configured to receive the rich exhaust 116 directly or indirectly from the rich combustion chamber 102. In particular, the exhaust inlet 130 is in fluid communication with the rich exhaust outlet 114.

Processor 104 may be any mechanical device or combination of mechanical devices configured to distribute hot gases into drill cuttings received by the processing chamber 106. The components of the processor 104, including those of the processing chamber 106, are selected to operate reliably at temperatures sufficient to vaporize the drilling fluids contaminating the wet drill cuttings 124. According to some embodiments, selection of the components of the processor 104 takes into consideration an additional safety margin to give a maximum failure temperature above a pre-determined operating temperature, as discussed further below.

Processor 104 is configured to provide the rich exhaust 116 to the processing chamber 106, via exhaust inlet 130, to contact and directly heat the received wet drill cuttings 124 by convection so that at least a portion of the drilling fluid is evaporated therefrom and at least some dry solid cuttings remain. According to some embodiments, the processor 104 is configured to agitate or mechanically mix the wet drill cuttings 124 received into the processing chamber 106 while the rich exhaust 116 is being provided thereto. The agitation or mechanical mixing helps facilitate the heating and drying of the wet cuttings by conduction, and to transfer heat from drier drill cuttings to less dry drill cuttings. Any suitable device or combination of devices or components to agitate or mechanically mix the drill cuttings is contemplated.

Figure 1B:
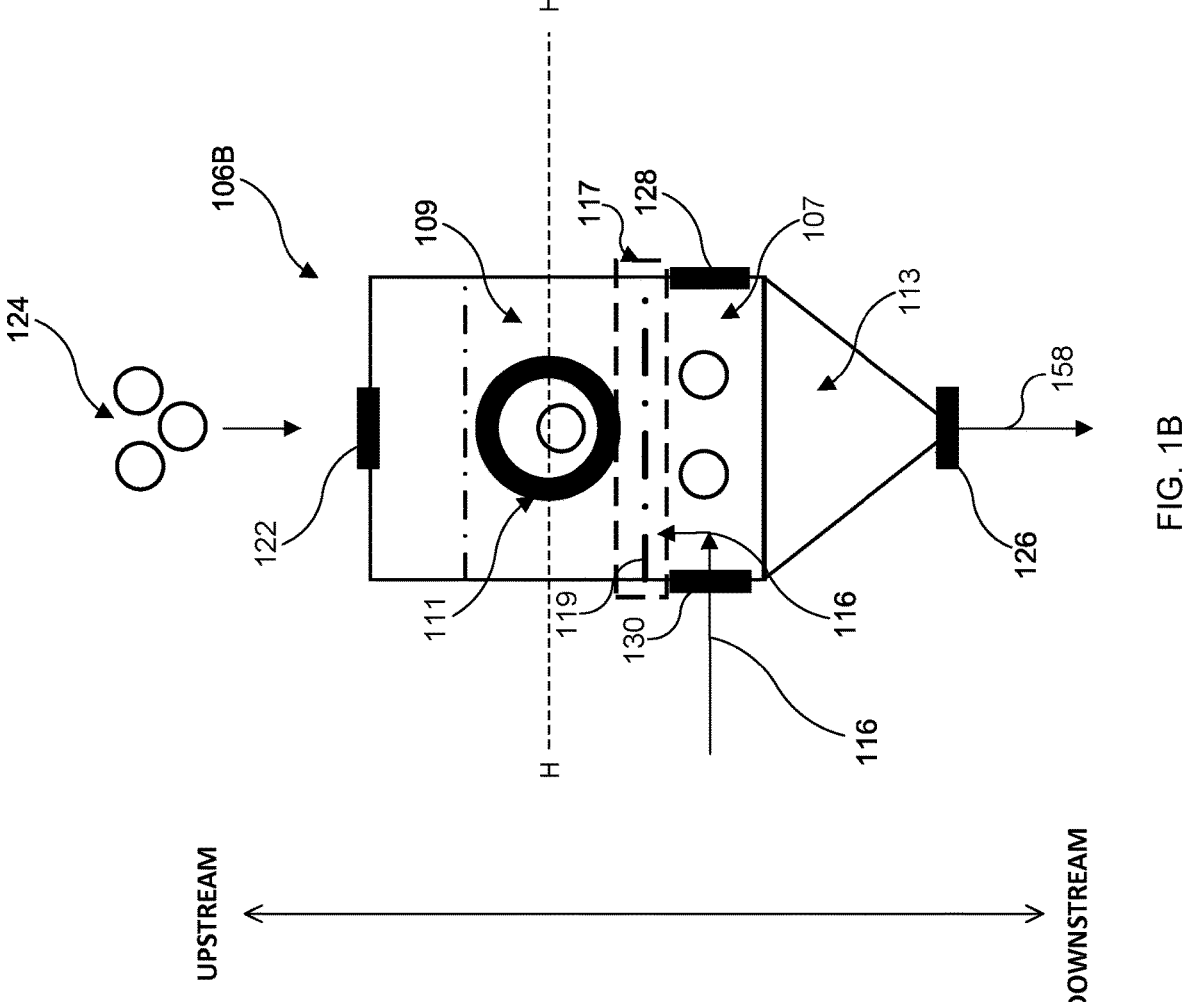
FIG. 1B depicts a processing chamber of a system for removing drilling fluid from wet drill cuttings, according to non-limiting embodiments.

Attention is directed to FIG. 1B, which depicts example processing chamber 106B according to non-limiting embodiments and in which like or similar elements are denoted by like or similar numbers in FIG. 1A. For simplicity and ease of understanding, discussion of the systems and devices depicted in FIG. 1B will focus on certain similarities and differences from those depicted in FIG. 1A. Processing chamber 106B comprises fixed stage 107 and agitator stage 109. Fixed stage 107 is in fluid communication with exhaust inlet 130 and configured to receive rich exhaust 116. Fixed stage 107 comprises fixed bed 119, which comprises at least one fluidly permeable interface operatively connected to exhaust inlet 130. Agitator stage 109 is in fluid communication with fixed bed 119 and configured to receive rich exhaust 116 therefrom. As shown in FIG. 1B, agitator stage 109 may be upstream fixed stage 107. Agitator stage 107 is also operatively connected to cuttings inlet 122 to receive wet drill cuttings 124 therefrom. In addition, agitator stage 107 comprises at least one mixing device, such as mixing device 111, configured to agitate wet drill cuttings 124 received via cuttings inlet 122. According to some embodiments, mixing device 111 is a mechanical mixing device.

According to some embodiments, processing chamber 106B further comprises a purging device 113 downstream fixed stage 107 and configured to compel at least a portion of the dry solid drill cuttings 158 for receipt by the dry solids outlet 126. According to some embodiments, purging device 113 comprises a screw conveyor configured to remove at least a portion of the processed cuttings from the bottom of fixed stage 107.

According to some embodiments, fixed stage 107 comprises a heat distribution system 117 configured to distribute the received rich exhaust 116 across at least one heat distribution plane of agitator stage 109, such as heat distribution plane H-H (which may be parallel to an axial plane of mixing device 111).

In operation, rich exhaust 116 received from exhaust inlet 130 is distributed into fixed bed 119. According to some embodiments, the rich exhaust 116 is distributed across a plane parallel to the axial plane of mixing device 111, for example, (which may be a mechanical tumbling device), and downstream the area agitated by mixing device 111, forming a fixed, heated bed downstream the agitator stage 109.

Introducing rich exhaust 116 to wet drill cuttings 124 in stages (a fixed stage and an agitator stage) may provide for uniform distribution of the rich exhaust 116 to wet drill cuttings 124, which may provide for more uniform and efficient heat transfer while also providing more of the rich exhaust 116 to the interior of the processing chamber 106B than externally (for better thermal efficiency). In addition, combining a fixed stage and an agitator stage may also provide for increased residence time for agglomerates to dry. As the agglomerates dry, fine particles that are released usually tend to migrate up to the agitator stage while heavier particles may remain. A purging device may be used to assist in the downstream migration of the heavier particles and agglomerates into the fixed stage.

As shown in FIG. 1A, for example, processor 104 is further configured to provide the evaporated drilling fluid 134 to the evaporated drilling fluids outlet 128 for recovery therefrom and to provide the dry solid drill cuttings 158 to the dry solids outlet 126 for recovery therefrom.

The at least one condensing device 108 comprises a condenser inlet 132 in fluid communication with the evaporated drilling fluids outlet 128. The at least one condensing device 108 is configured to condense at least a portion of the evaporated drilling fluids 134 received directly or indirectly from the evaporated drilling fluids outlet 128 via the condenser inlet 132, and to provide condensed drilling fluid 136 to a condenser outlet 138 for recovery therefrom. Any suitable device or combination of devices for condensing at least a portion of the evaporated drilling fluids 134 are contemplated.

As discussed above, according to some embodiments, the combustion air 118 is pre-heated to a pre-heat temperature, $T_P$, prior to being provided to the rich combustion chamber 102. $T_P$ is lower than $T_R$. Pre-heating the combustion air 118 helps improve the thermal efficiency of system 100, which in at least some embodiments, reduces the amount of fuel required to be added for the rich combustion. The pre-heating of the combustion air 118 may be achieved using a variety of set-ups, examples of which are shown and described in the present application.

As would be understood, heat is released as the evaporated drilling fluid 134 is being condensed. According to some embodiments, described systems and methods include components to recover at least a portion of the released heat to pre-heat the combustion air 118.

Figure 2:
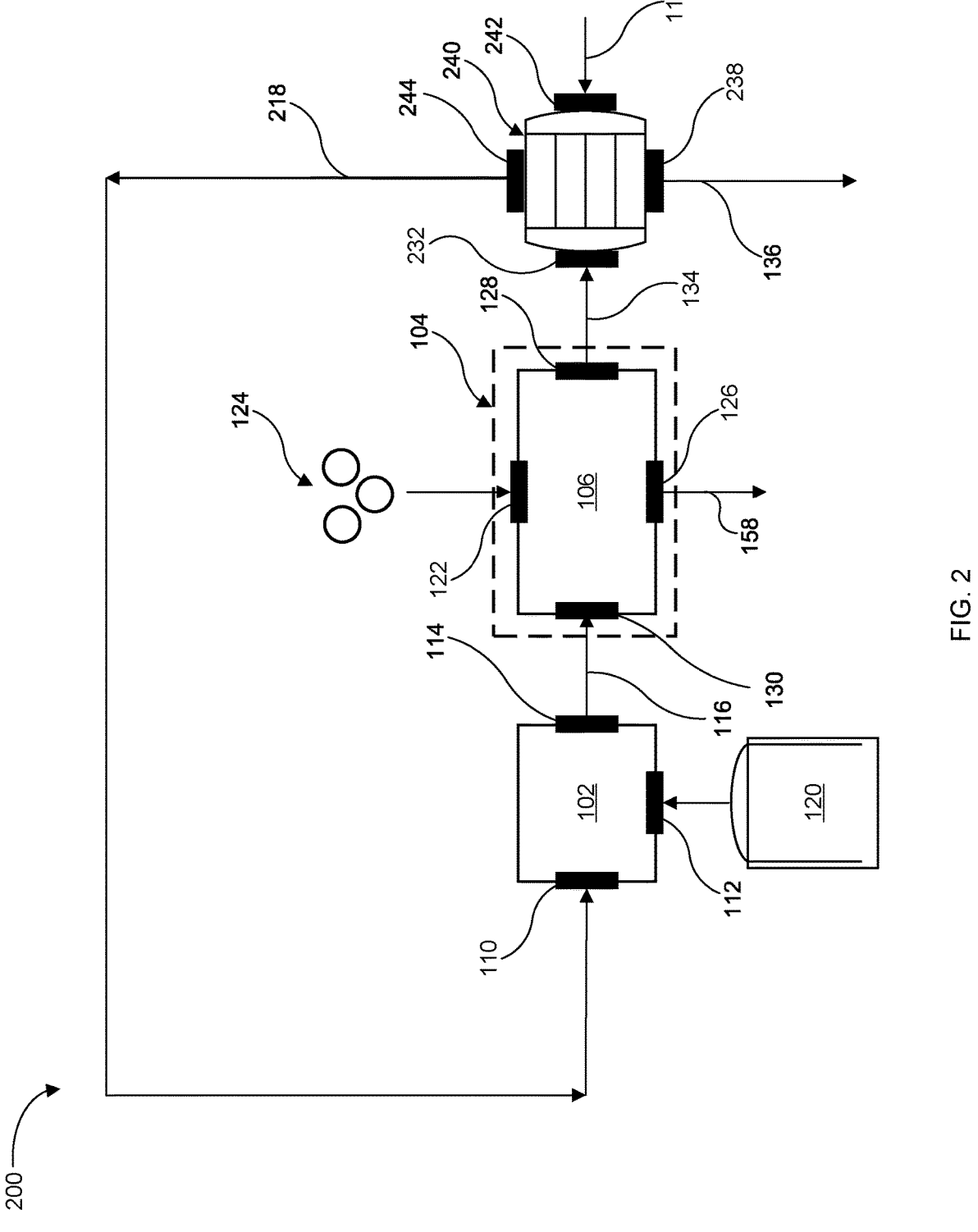
FIG. 2 depicts a system for removing drilling fluid from wet drill cuttings, according to a second set of non-limiting embodiments.

Attention is directed to FIG. 2, which depicts example system 200 for removing drilling fluid from wet drill cuttings, according to non-limiting embodiments, and in which like or similar elements are denoted by like or similar numbers in FIG. 1A. For simplicity and ease of understanding, discussion of the systems and devices depicted in FIG. 2 will focus on certain similarities and differences from those depicted in FIG. 1A.

Similarly to system 100, system 200 comprises a rich combustion chamber 102 and a processor 104, having a processing chamber 106, and at least one condensing device. In system 200, the at least one condensing device is a heat exchanger 240. Similarly to the condensing device 108, the heat exchanger 240 is configured to receive evaporated drilling fluids from the evaporated drilling fluids outlet 128 (such as via inlet 232), to condense at least a portion of the received evaporated drilling fluids, and to provide condensed drilling fluid 136 to an outlet (such as outlet 238) for recovery therefrom. The heat exchanger 240 also comprises at least one combustion air inlet 242, to receive combustion air 118 therein, and at least one heat outlet 244. The heat exchanger 240 is configured to pre-heat the received combustion air 118 using heat recovered from the evaporated drilling fluids 134 during the condensing process and to provide the pre-heated combustion air, pre-heated combustion air 218 in FIG. 2, to the rich combustion chamber 102, such as via the at least one air inlet 110 for combustion. Any suitable heat exchanger is contemplated.

Although system 200 depicts a single device to condense the evaporated fluid and heat the combustion air 118, it is understood that, according to some embodiments, the condensing and heating actions are performed by more than one device. For example, according to some embodiments, the system comprises a condensing device configured to receive and condense the evaporated drilling fluid, and a heating device configured to heat combustion air, such as combustion air 118, and to provide the pre-heated combustion air to the rich combustion chamber 102 (such as via the at least one air inlet 110).

Figure 3:
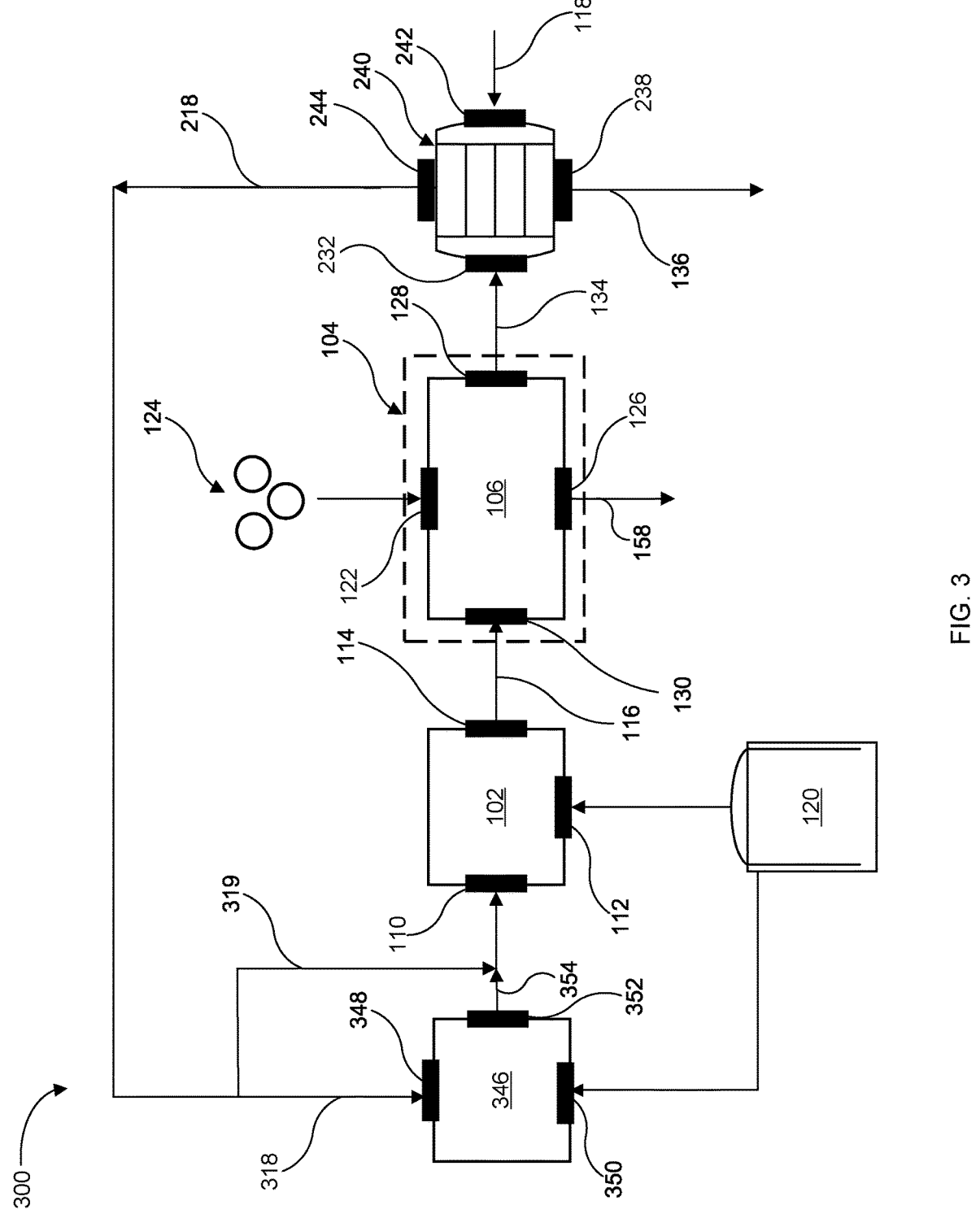
FIG. 3 depicts a system for removing drilling fluid from wet drill cuttings, according to a third set of non-limiting embodiments.

Attention is directed to FIG. 3, which depicts example system 300 for removing drilling fluid from wet drill cuttings, according to non-limiting embodiments, and in which like or similar elements are denoted by like or similar numbers in FIGS. 1A, 1B and 2. For simplicity and ease of understanding, discussion of the systems and devices depicted in FIG. 3 will focus on certain similarities and differences from those depicted in FIGS. 1A, 1B and 2.

System 300 comprises a pre-heat combustion chamber 346 in addition to the components described in FIGS. 1A, 1B and/or 2. Pre-heat combustion chamber 346 is configured to combust a lean air-fuel mixture at a pre-heat combustion temperature, $T_L$, thereby producing a pre-heated combustion exhaust 354 for receipt by the rich combustion chamber 102. Pre-heat combustion chamber 346 comprises at least one pre-heat air inlet 348 in fluid communication with either the heat outlet 244 or an outlet for a combustion air source (not shown). The pre-heat air inlet 348 is configured to receive at least a portion of combustion air therein, such as the portion of pre-heated combustion air 218 depicted as portion 318. The remainder of the pre-heated combustion air 218, depicted as remainder 319, may be combined with the pre-heated combustion exhaust 354 and provided to the rich combustion chamber 102. The pre-heat combustion chamber 346 also comprises at least one pre-heat fuel inlet 350 in fluid communication with a fuel source, such as natural gas fuel source 120. The pre-heat combustion chamber 346 is configured to add fuel from the fuel source and at least one pre-heat exhaust outlet 352 in fluid communication with the air inlet 110 of the rich combustion chamber 102.

As noted above, pre-heat combustion chamber 346 is configured to heat a lean air-fuel mixture, which is comprised of the pre-heated combustion air 318 or the combustion air 118 (according to some embodiments) and fuel that is added as necessary to reach a desired lean-burn condition (lean air-fuel mixture). Since the lean air-fuel mixture comprises more oxygen than the rich fuel-air mixture, the pre-heat combustion temperature, $T_L$, is lower than the rich combustion temperature, $T_R$.

Figure 4:
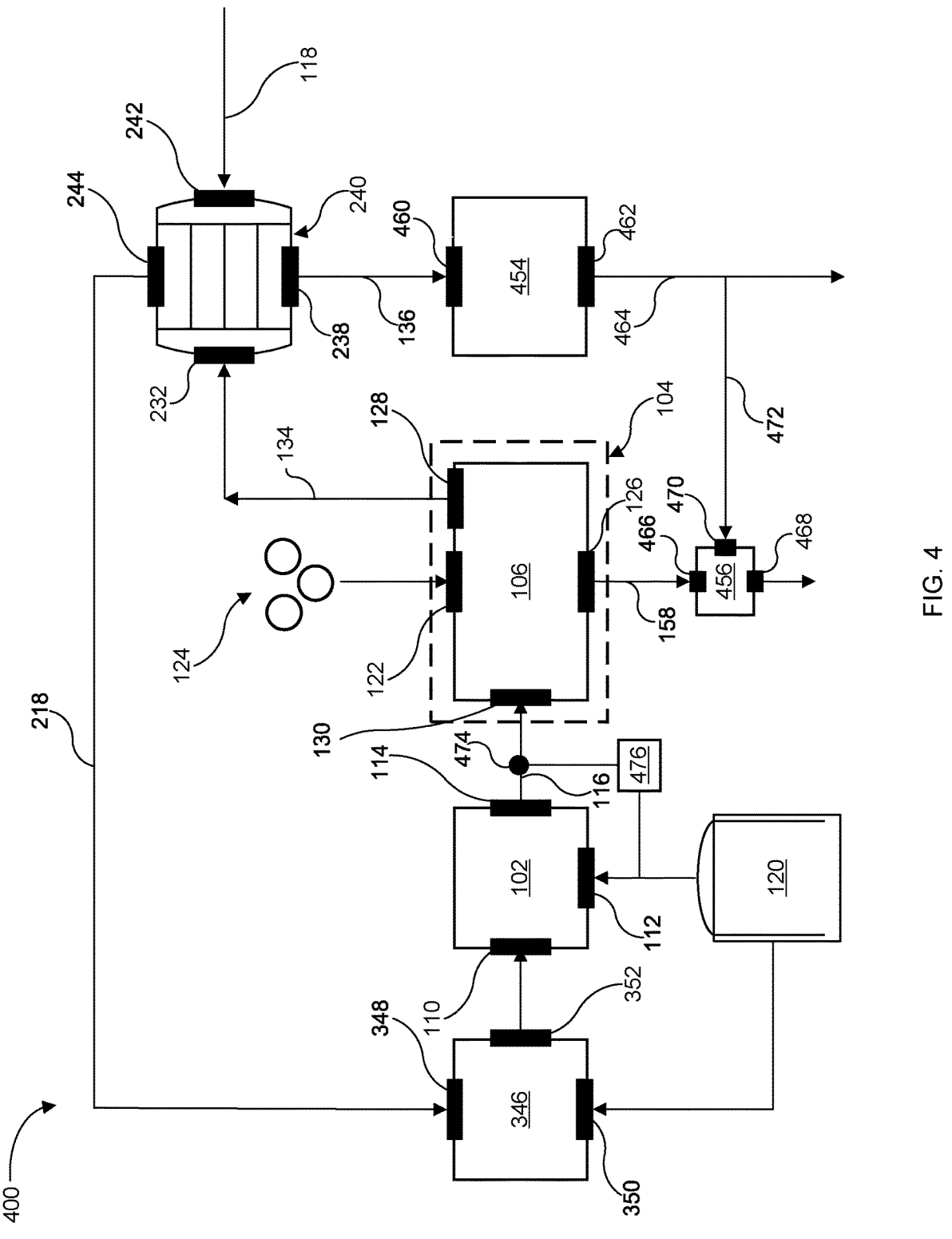
FIG. 4 depicts a system for removing drilling fluid from wet drill cuttings, according to a fourth set of non-limiting embodiments.

According to some embodiments, the described systems and methods comprise additional features to recycle and fine tune the input and outputs. Attention is directed to FIG. 4, which depicts example system 400 for removing drilling fluid from wet drill cuttings, according to non-limiting embodiments, and in which like or similar elements are denoted by like or similar numbers in FIGS. 1A to 3. For simplicity and ease of understanding, discussion of the systems and devices depicted in FIG. 4 will focus on certain similarities and differences from those depicted in FIGS. 1A to 3. As shown in FIG. 4, system 400 further comprises a secondary cooling device 454 to further cool condensed drilling fluid 136 recovered from condenser outlet 138 of condensing device 108 or outlet 238 of heat exchanger 240 (as depicted in FIG. 4). Secondary cooling device 454 comprises at least one cooling device inlet 460 configured to receive condensed drilling fluid 136 directly or indirectly from condenser outlet 138 or outlet 238. In particular, cooling device inlet 460 is in fluid communication with condenser outlet 138 or outlet 238. Secondary cooling device 454 also comprises at least one cooling device outlet 462 for recovery of further cooled condensed drilling fluid 464 therefrom.

System 400 also comprises a solids cooling device 456 configured to receive the dry solid drill cuttings 158 directly or indirectly from the dry solids outlet 126. Solids cooling device 456 comprises at least one dry solids inlet 466 for receiving the dry solid drill cuttings 158 and at least one cooled dry solids outlet 468 for recovery therefrom, directly or indirectly.

According to some embodiments, solids cooling device 456 is configured to receive water for cooling the received dry solid drill cuttings 158. According to some embodiments, solids cooling device 456 is configured to receive water from a reservoir or other suitable source. According to some embodiments, waste water and/or water recycled from components of the systems described herein, such as system 400, is provided to solids cooling device 456. For example, according to some embodiments, the secondary cooling device 454, heat exchanger 240 and/or condensing device 108 is configured to separate at least some water 472 from the condensed drilling fluid 136 and/or the further cooled condensed drilling fluid 464 and to provide the recovered water 472 to the solids cooling device 456. According to some embodiments, as depicted in FIG. 4, the solids cooling device 456 comprises at least one water inlet 470 that is in fluid communication with cooling device outlet 462, condenser outlet 138, outlet 238 and/or other suitable outlet of the secondary cooling device 454, heat exchanger 240 and/or condensing device 108.

As discussed above, a feature of the described systems and methods is using a very hot process gas stream to directly heat and dry the wet drill cuttings. The oxygen level of the post-combustion process gas is in a range low enough to allow the process gas to reach an elevated temperature sufficient for thermal desorption of the drilling fluids and to achieve a lower risk of explosion than process gas having excess oxygen (lean mixture). For example, U.S. Pat. No. 6,695,077 (Szymocha et al.), which is incorporated herein by reference, recommends maintaining an oxygen level below 8% on a mole fraction basis to prevent explosion of the drilling fluid vapor. According to some embodiments, the oxygen level in the process gas stream is about 8% or less. According to some embodiments, the oxygen level in the process gas stream is about 1%. According to some embodiments, the oxygen level in the process gas stream is in the range of about 1% to about 2% or in the range of about 1% to about 8%. The pre-heated combustion air in conjunction with the expected, slightly elevated combustion pressures will help force the process gas through the drill cutting solids, after which the pressure in the vapor space will only be slightly above atmospheric. The low oxygen level of the process gas stream provides for minimum excess gas to heat, higher process gas temperatures and, in combination with the high degree of nitrogen dilution, minimizes potential for any unwanted chemical reactions. The exact oxygen level realized in operation may be determined by the degree of combustion air pre-heating and the back pressure in the rich combustion chamber 102.

According to some embodiments, the temperature of the hot process gas stream is in a range of about 300° C. to about 500° C., or a range of about 300° C. to about 400° C., or a range of about 400° C. to about 500° C. According to some embodiments, the temperature of the hot process gas stream is about 500° C. It is understood that the inlet temperature of the processing chamber exhaust inlet 130, and associated ducts/nozzles, may be higher, and material selection may take these higher temperatures into account. For example, the temperature profile of the processor 104, including the processing chamber 106, after the gas enters the processing chamber 106 is such that the process gas gives up its heat typically within a few inches to asymptotically approach the process gas temperatures described above.

Accordingly, the systems and methods described herein may comprise additional devices and features to help monitor and/or modify characteristics of the fluid flow, such as the oxygen level and flow rate, to help improve thermal efficiency, reduce waste products and/or conserve fuel. For example, according to some embodiments, the described systems, such as system 400, comprise one or more of a rich oxygen sensor 474a and a rich exhaust carbon monoxide sensor 474b (collectively referred to herein as exhaust sensors 474). The rich exhaust oxygen sensor 474a is configured to determine an oxygen level of the rich exhaust 116 prior to receipt by the processing chamber 106 and the rich exhaust carbon monoxide sensor 474b is configured to determine a carbon monoxide level of the rich exhaust 116 prior to receipt by the processing chamber 106. According to some embodiments, the activities of the rich exhaust oxygen sensor 474a and the rich exhaust carbon monoxide sensor 474b are performed by the same sensing device. However, according to some embodiments, the activities of the rich exhaust oxygen sensor 474a and the rich exhaust carbon monoxide sensor 474b are performed by individual sensing devices. Any suitable sensing devices are contemplated.

According to some embodiments, the systems further comprise a controller 476 operatively connected to the fuel inlet 112 of the rich exhaust combustion chamber 102 and at least one of the rich exhaust oxygen sensor 474a and the rich exhaust carbon monoxide sensor 474b. Controller 476 operates similarly to the speed control on a car, where the throttle supplies fuel to the engine and the control system fine tunes oxygen and other sensors, and when the load gets to a certain level, the transmission shifts down one or more gears. In particular, the controller 476 is configured to adjust the fuel-air ratio of the rich fuel-air mixture based on the sensed oxygen level and/or the sensed carbon monoxide level. Controller 476 comprises any suitable device or combination of devices, including computing devices. For example, according to some embodiments, controller 476 performs fuel feed rate control (rate fuel is fed to the rich combustion chamber 102) and/or burner control of the rich combustion chamber 102. Controller 476 may comprise a programmable logic controller (PLC) that receives inputs from the rich exhaust oxygen sensor 474a and/or the rich exhaust carbon monoxide sensor 474b. Controller 476 may be configured to execute computer-executable instructions to modulate at least one of the rich combustion chamber burners to maintain the temperature of the rich exhaust 116, as measured in the solids at, for example, the dry solids exit 126, or at any other suitable point(s) in the fluid flow by an operatively connected temperature sensor (such as temperature sensor 591), with additional temperature readings from the vapor space whereby temperature of both is required to be maintained above preset levels, and the rich exhaust oxygen sensor 474a and/or the rich exhaust carbon monoxide sensor 474b fine tune fuel feed to maintain desired process gas parameters. The temperature measured at the dry solids exit, such as dry solids exit 126, may be a suitable proxy for the degree of dryness in the solids based on drilling fluid distillation curves.

According to some embodiments, the fuel feed rate is subordinate to the burner to maintain the desired process gas parameters. When the burner is off, the fuel feed is off. As would be understood by a person skilled in the art, various instruments can be included as part of, or to work in concert with, controller 476 to meet regulatory and safe operation needs. For example, the systems described herein can comprise temperature and pressure sensors, insulation, backflow prevention, flow meters, pumps and/or valves. In addition, persons skilled in the art would appreciate that the described systems could include ancillary equipment, such as recovered product storage and/or safety equipment.

Figure 5:
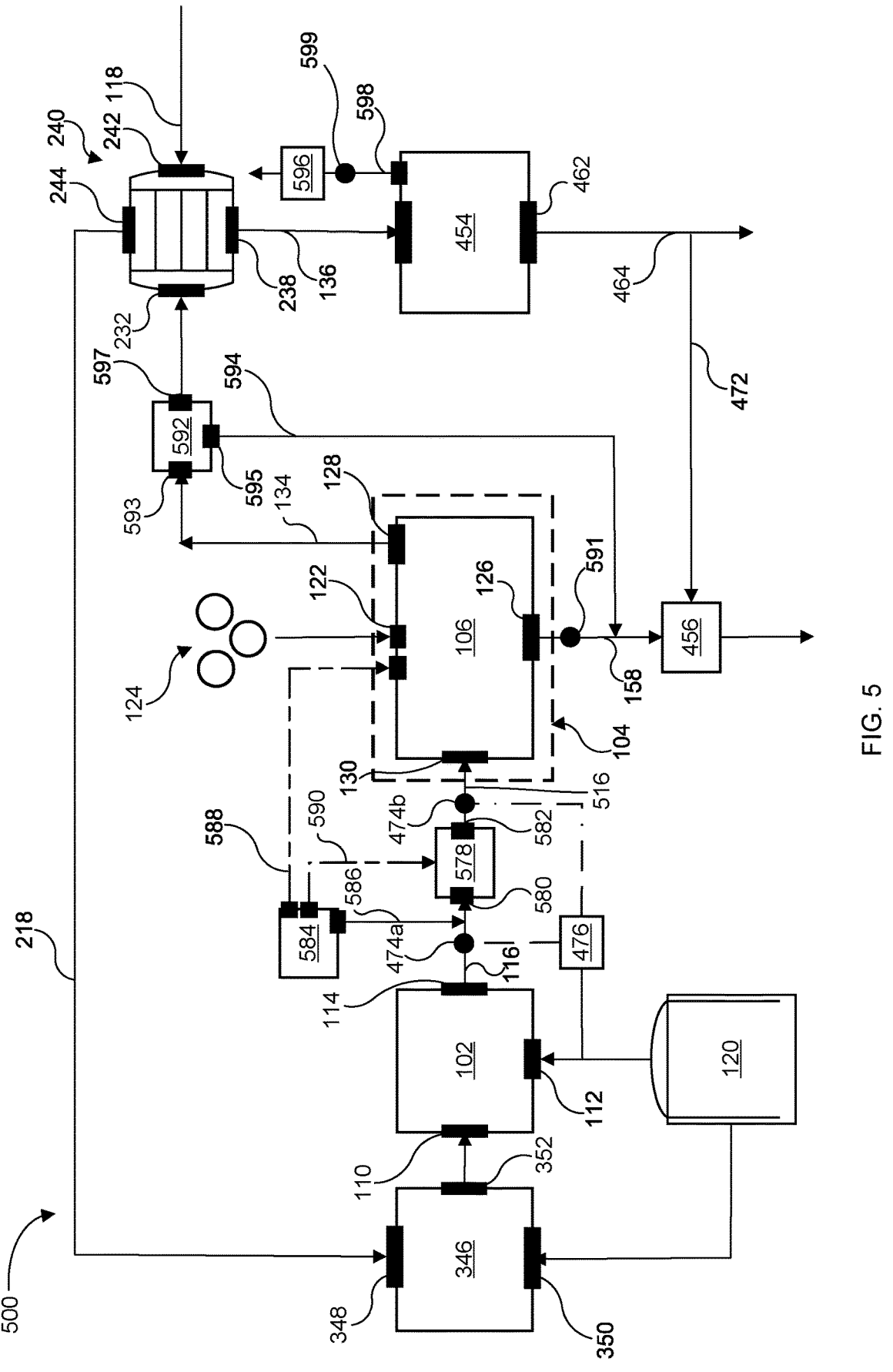
FIG. 5 depicts a system for removing drilling fluid from wet drill cuttings, according to a fifth set of non-limiting embodiments.

Attention is directed to FIG. 5, which depicts example system 500 for removing drilling fluid from wet drill cuttings, according to non-limiting embodiments, and in which like or similar elements are denoted by like or similar numbers in FIGS. 1A to 4. For simplicity and ease of understanding, discussion of the systems and devices depicted in FIG. 5 will focus on certain similarities and differences from those depicted in FIGS. 1A to 4.

System 500 comprises components to reduce waste constituents and to increase thermal efficiency. According to some embodiments, system 500 comprises an exhaust heater 578 to provide a thermal "boost" to the rich exhaust 116 before it is provided to the processing chamber 106. Exhaust heater 578 is in fluid communication with the at least one rich exhaust outlet 114 and is configured to further heat the rich exhaust 116 received therefrom to a temperature higher than the rich combustion temperature $T_R$ (to an exhaust heat temperature $T_E$, which is greater than $T_R$). Exhaust heater 578 is also configured to provide the further heated rich exhaust 516, directly or indirectly, to the processing chamber 106 via, for example, the exhaust inlet 130. For example, exhaust heater 578 comprises at least one exhaust heater inlet 580 in fluid communication with the at least one rich exhaust outlet 114 and at least one exhaust heater outlet 582 in fluid communication with the exhaust inlet 130. According to some embodiments, the exhaust heater 578 is an electric heater. However, the exhaust heater 578 comprises any suitable device or combination of devices.

According to some embodiments, system 500 comprises a gas engine, such as natural gas engine 584, configured to provide additional exhaust 586 therefrom to the processing chamber 106. For example, according to some embodiments, the additional exhaust 586 is mixed with the further heated rich exhaust 516, and, according to some embodiments, the additional exhaust 586 is provided separately to the processing chamber 106 via another inlet of processing chamber 106. According to some embodiments, the gas engine provides motive force and/or electricity to the processor 104 and/or the exhaust heater 578. For example, natural gas engine 584 may provide at least some shaft power 588 to the processor 104. As another example, the gas engine may provide at least some electricity, such as surplus electricity 590, to power exhaust heater 578.

System 500 also comprises components to facilitate the recovery of solids and/or fluids, and to reduce waste constituents. According to some embodiments, system 500 comprises at least one fine filter 592 in fluid communication with the evaporated drilling fluids outlet 128 and configured to separate fine solid drill cuttings 594 from the evaporated drilling fluids 134. For example, fine filter 592 comprises at least one filter inlet 593 in fluid communication with the evaporated drilling fluids outlet 128 and at least one filter outlet, such as filter outlets 595 and 597. According to some embodiments, the separated fine solid drill cuttings 594 are provided to solids cooling device 456, such as via filter outlet 595, for further cooling with the recovered dry solids 158. According to some embodiments, a portion of the condensed drilling fluid 136 comprises non-condensable gases and system 500 comprises a flare stack 596 to burn off at least a portion of the non-condensable gases 598. According to some embodiments, the non-condensable gases 598 flow through at least one carbon monoxide sensor 599 configured to determine a carbon monoxide level of the non-condensable gases 598.

Figure 6:
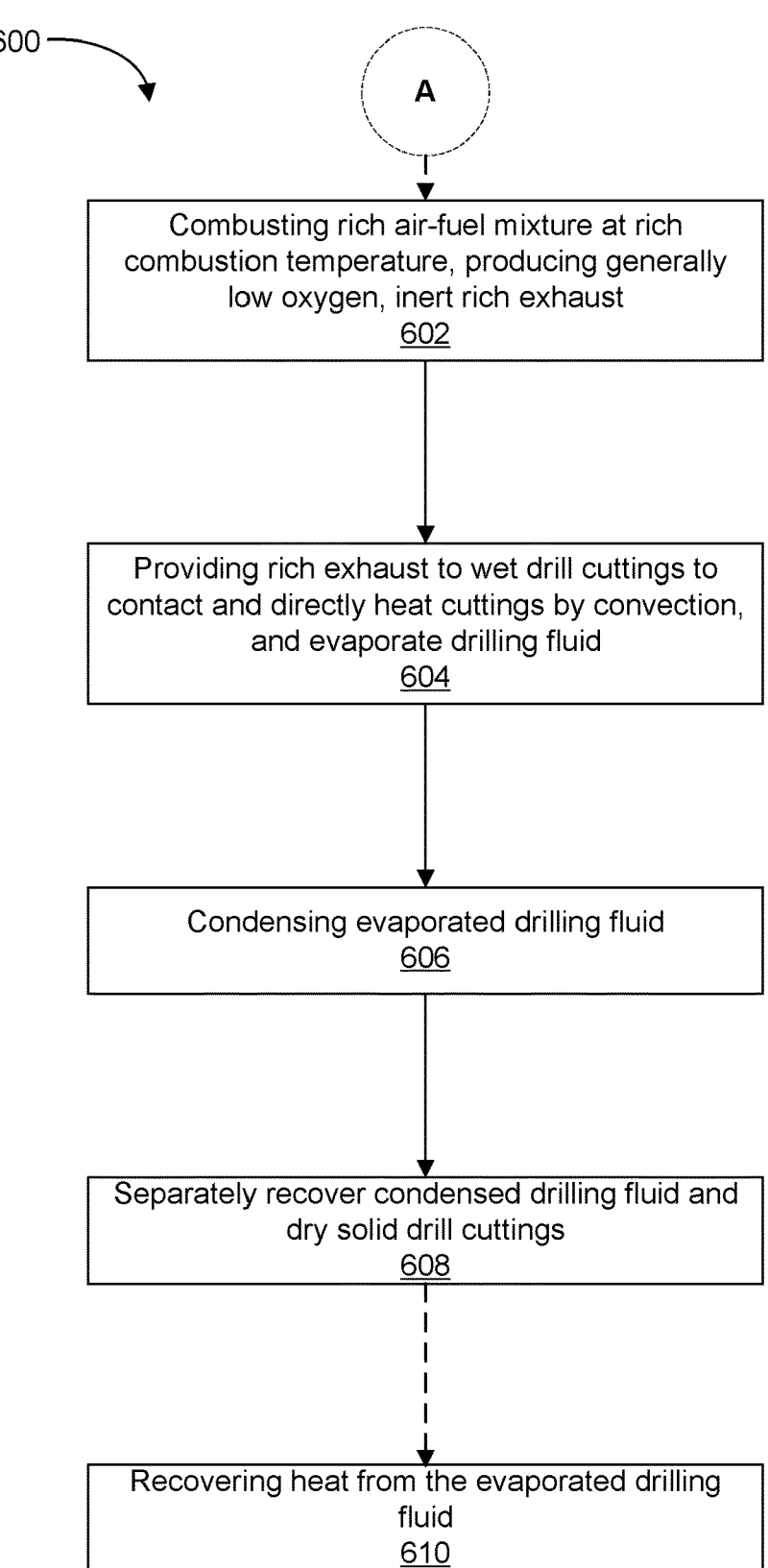
FIGS. 6 to 8 depict a method for removing drilling fluid from wet drill cuttings, according to non-limiting embodiments.
Figure 7:
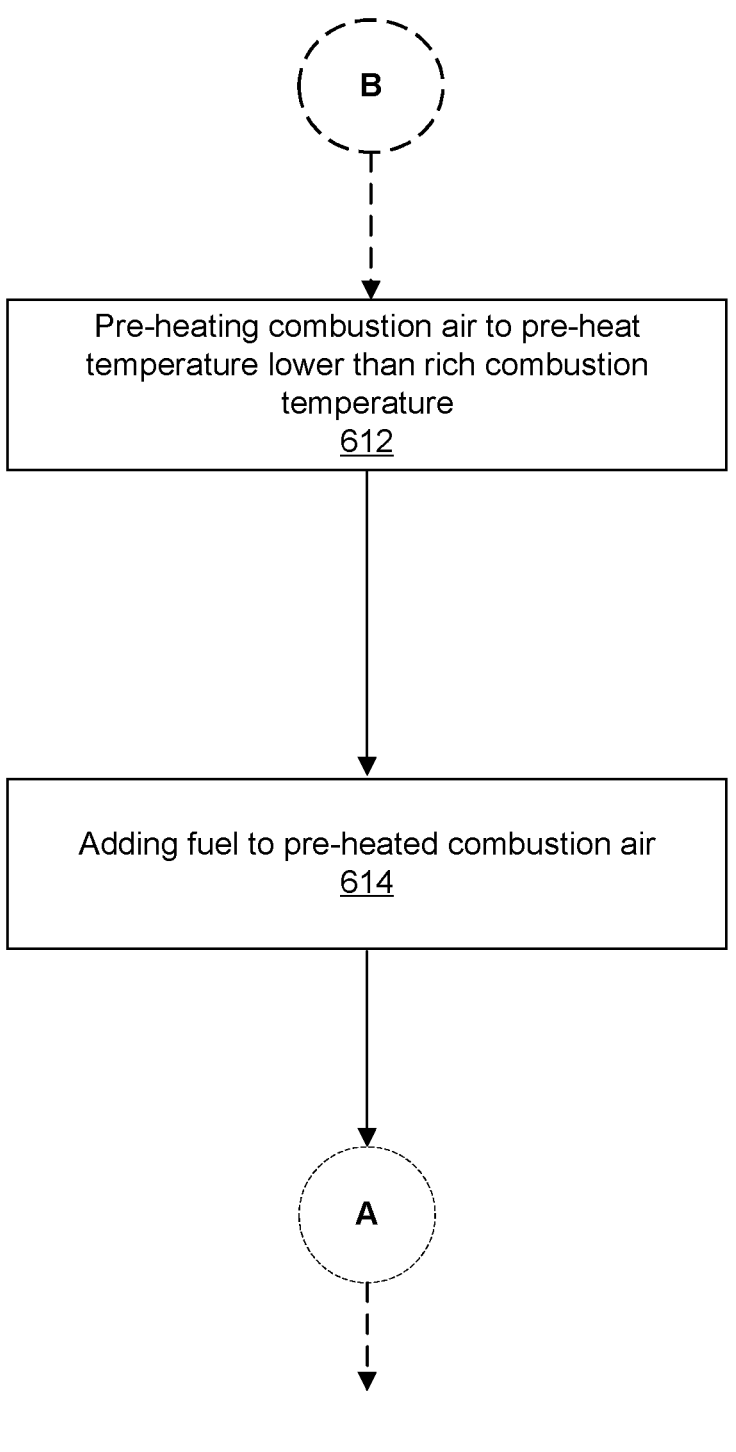
Figure 8:
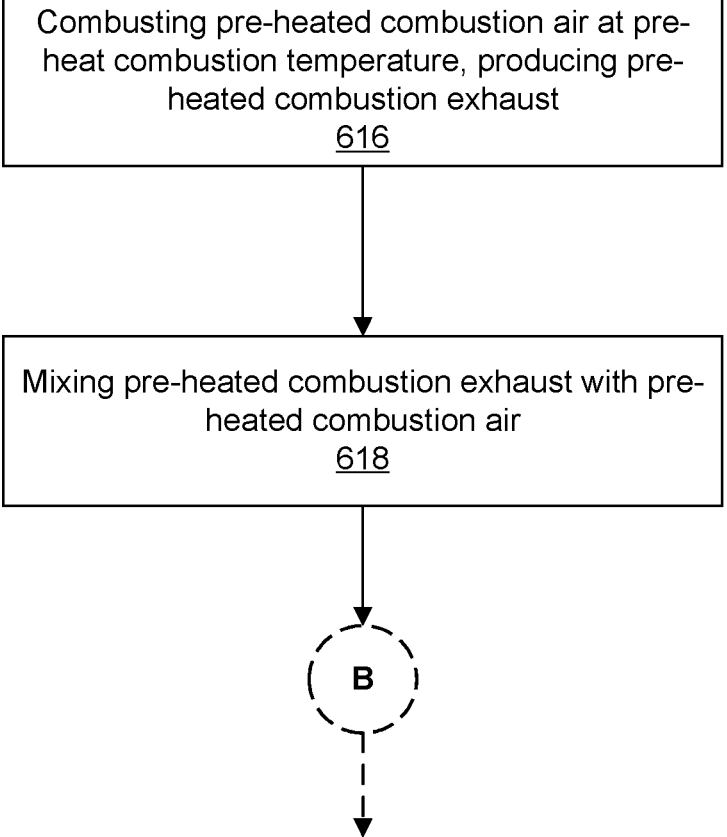

Attention is now directed to FIGS. 6 to 8 which depict a flowchart of a method 600 for removing drilling fluid from wet drill cuttings. In order to assist with in the explanation of method 600, it will be assumed that method 600 is performed using example systems 100 to 500, as indicated. Furthermore, the following discussion of method 600 will lead to a further understanding of systems 100 to 500, and the various components of those systems. However, it is to be understood that systems 100 to 500 and/or method 600 can be varied and need not work exactly as discussed herein in conjunction with each other, and that such variations are within the scope of the present embodiments. It is to be emphasized, however, that method 600 need not be performed in the exact sequence as shown, unless otherwise indicated; and likewise various blocks may be performed in parallel rather than in sequence. Hence, the elements of method 600 are referred to herein as "blocks" rather than "steps". It is also to be understood, however, that method 600 can be implemented on variations of systems 100 to 500 as well.

As discussed above, the described methods, including method 600, are performed at a pressure above atmospheric pressure. At block 602, a rich air-fuel mixture is combusted at a rich combustion temperature, $T_R$, thereby producing a generally low oxygen, inert rich exhaust, such as rich exhaust 116. At block 604, the rich exhaust is provided to the wet drill cuttings, such as wet drill cuttings 124, to contact and directly heat the wet drill cuttings by convection. At least a portion of the drilling fluid is evaporated therefrom, such as evaporated drilling fluid 134, and at least some dry solid drill cuttings, such as solid dry drill cuttings 158, remain. At block 606, at least a portion of the evaporated drilling fluid is condensed to produce condensed drilling fluid 136. At block 608, the condensed drilling fluid and dry solid drill cuttings are separately recovered. According to some embodiments, at block 610, heat is recovered from the evaporated drilling fluid.

According to some embodiments, combustion air is pre-heated and mixed with fuel, to produce the rich air-fuel mixture of block 602. For example, as shown in FIG. 7, method 600 may further comprise, at block 612, pre-heating combustion air 118 to a pre-heat temperature, $T_P$, lower than the rich combustion temperature, $T_R$, to produce pre-heated combustion air, such as pre-heated combustion air 218. Pre-heating the combustion air may be accomplished in any suitable manner. For example, as discussed above, the combustion air may be pre-heated using heat recovered during the condensing of the evaporated drilling fluid (e.g., via heat exchanger 240). At block 614, fuel, such as natural gas from fuel source 120, flare gas or any other suitable fuel source, is added to the pre-heated combustion air to produce the rich air-fuel mixture of block 602.

According to some embodiments, a two-stage combustion process is used to reduce the oxygen level in the rich exhaust to a desired oxygen level to reduce the risk of explosion and allow for higher temperatures of the rich exhaust provided to the processing chamber to contact and directly heat the wet drill cuttings. For example, at block 616 (FIG. 8) method 600 further comprises combusting at least a portion of the pre-heated combustion air at a pre-heat combustion temperature to produce a pre-heated combustion exhaust, such as pre-heated combustion exhaust 354, prior to adding fuel to the pre-heated combustion air at block 614. The combustion performed at block 616 is a lean burn combustion, and fuel may be added to the air-fuel mixture that is to be combusted at block 616 to obtain the desired lean mixture. Since the air-fuel mixture that is being combusted at block 616 is a lean air-fuel mixture, the pre-heat combustion temperature is lower than the rich combustion temperature. At block 618, the pre-heated combustion exhaust is mixed with the pre-heated combustion air, diluting the oxygen in the mixture. The mixture of pre-heated combustion exhaust and pre-heated combustion air is provided to the rich combustion chamber 102.

Figure 9:
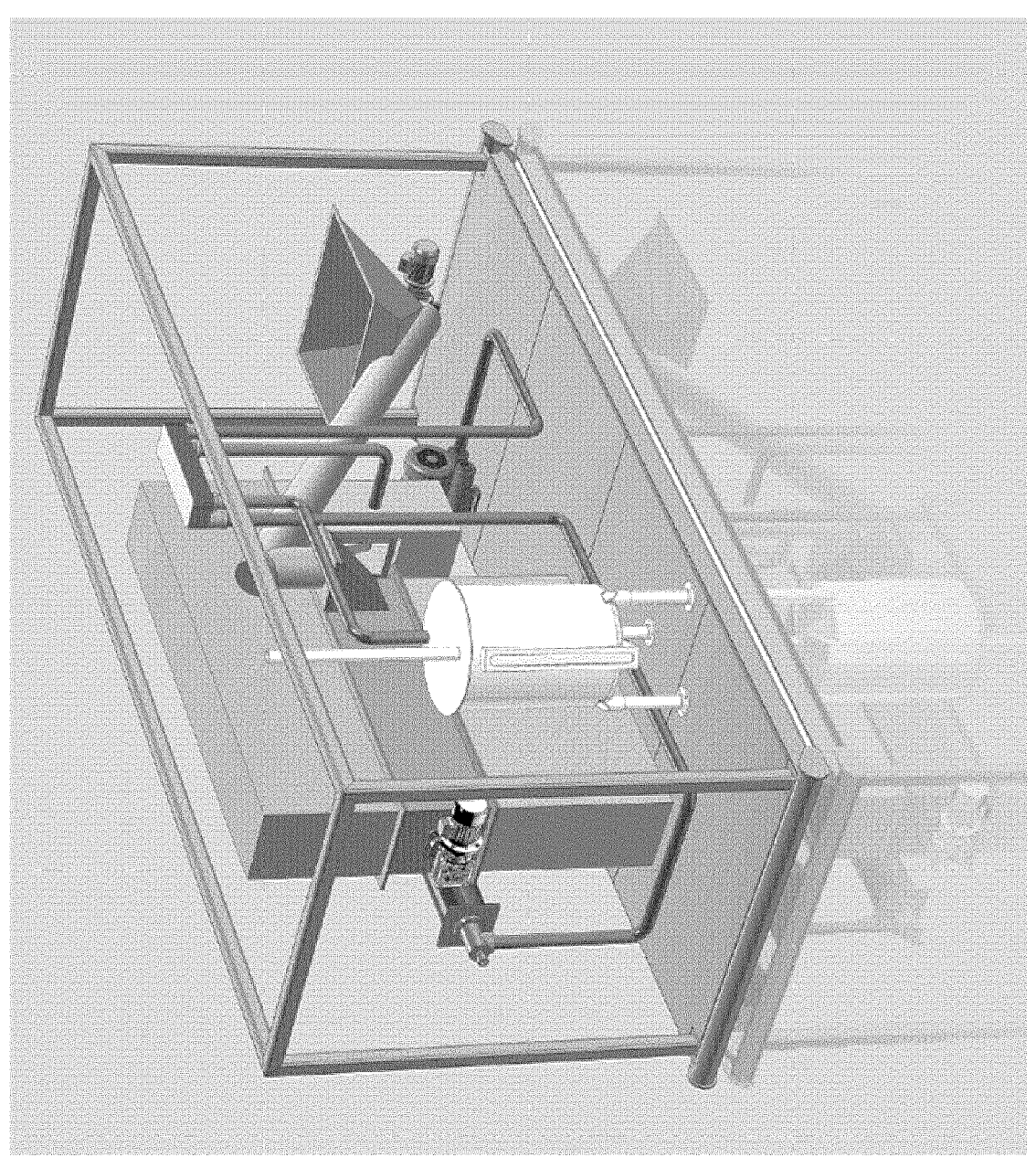
FIG. 9 depicts a three-dimensional rendering of a system for removing drilling fluid from wet drill cuttings, according to a non-limiting embodiment.
Figure 10A:
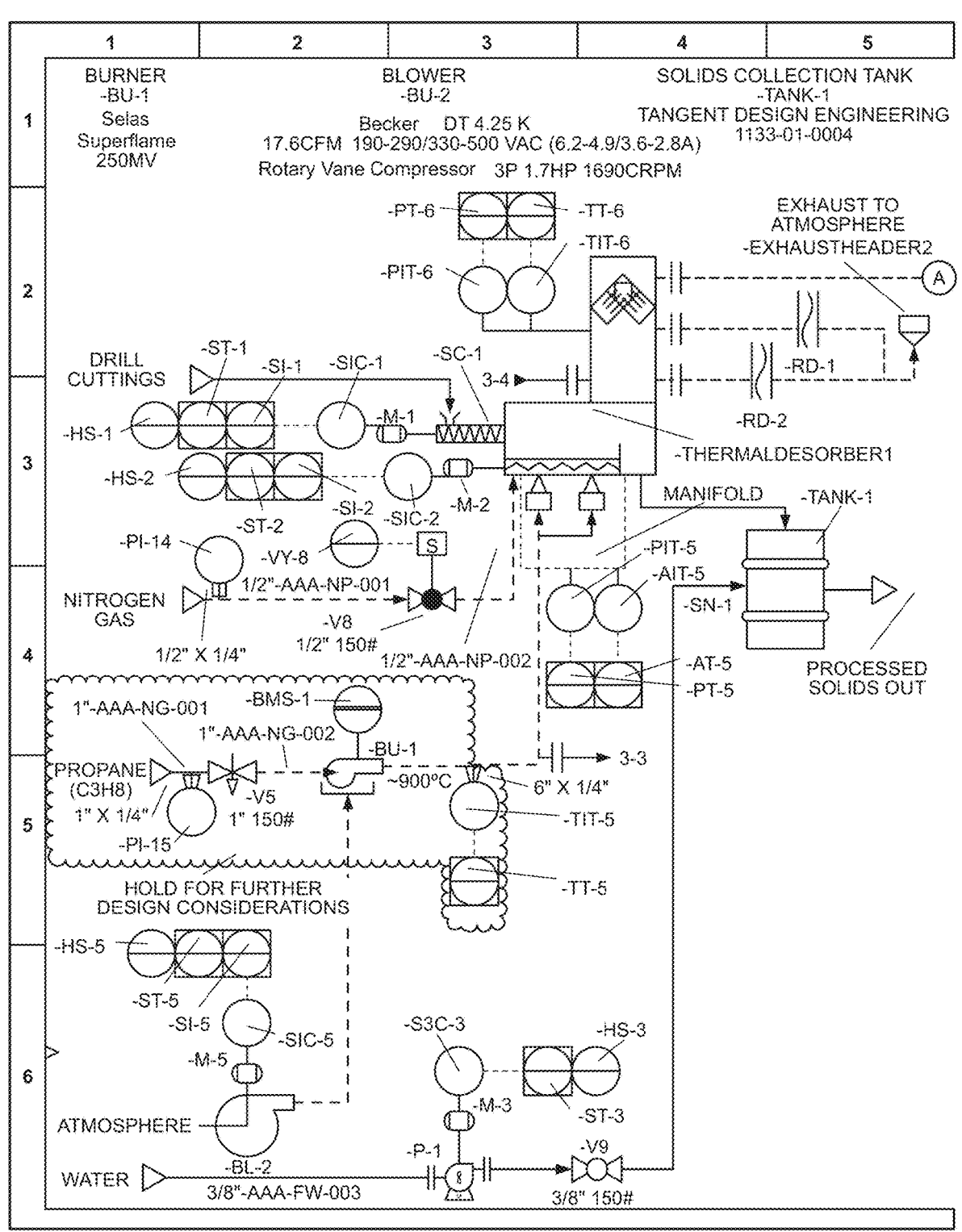
FIGS. 10A and 10B together depict a piping and instrumentation diagram for a system for removing drilling fluid from wet drill cuttings, according to a non-limiting embodiment.
Figure 10A:
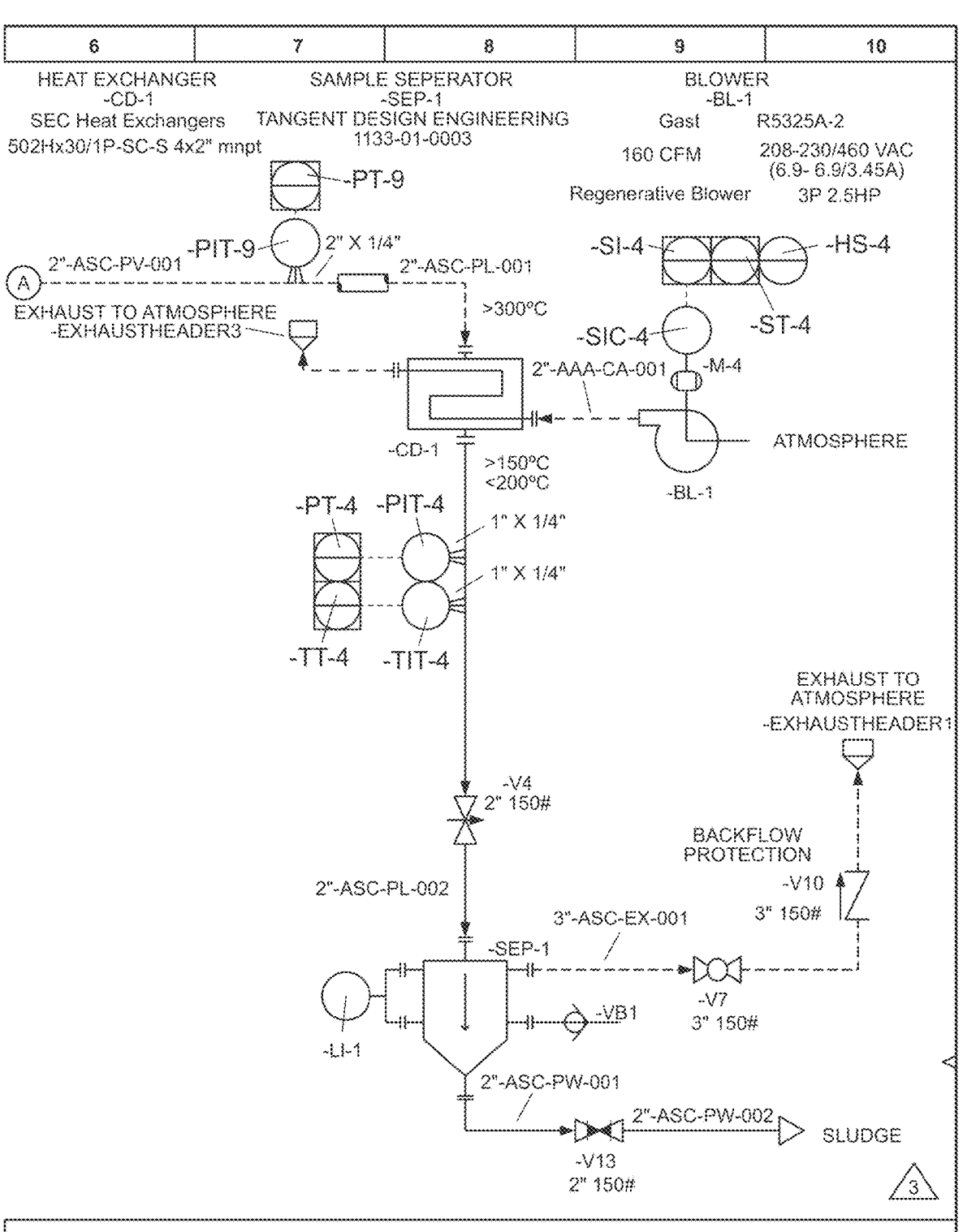
Figure 10B:
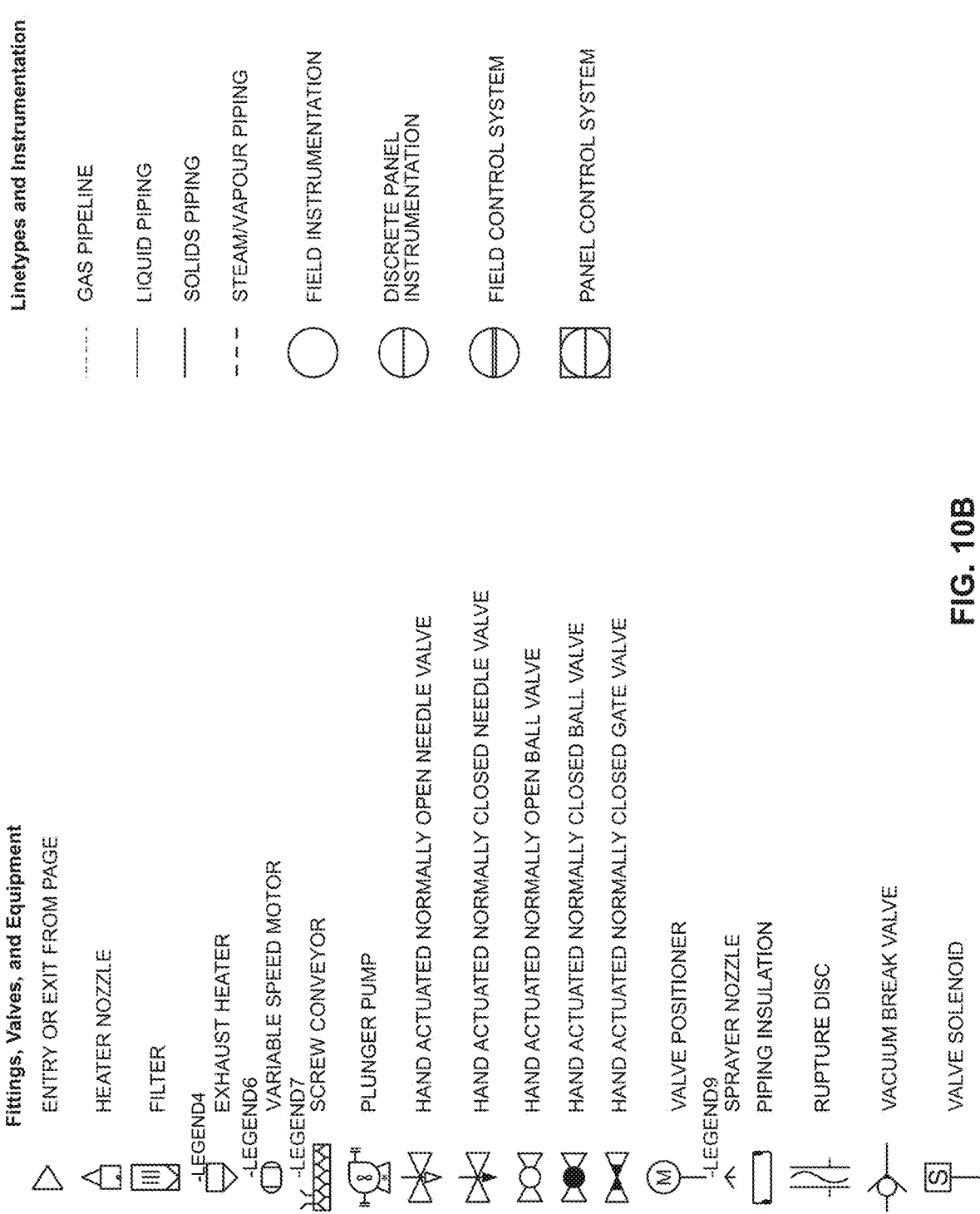

Attention is directed to FIGS. 9 to 10B, which depict a three-dimensional rendering of a system for removing drilling fluid from wet drill cuttings, according to a non-limiting embodiment (FIG. 9) and a piping and instrumentation diagram for a system for removing drilling fluid from wet drill cuttings, according to a non-limiting embodiment (FIGS. 10A and 10B).

Persons skilled in the art will appreciate that, for simplicity, some components that may facilitate safe, reliable operation of the system have been omitted. Such components include, but are not limited to, various sensors, valves, pumps, blowers, material handling equipment, pressure controls, backflow preventer devices and air locks. Additional means of improving thermal and energy efficiency may be incorporated in the described methods and systems. For example, additional heat recovery equipment may be included to minimize net heat loss. Such equipment may be sized to provide the desired heat input for expected or desired flow rates and liquid content, according to known teachings. The equipment may also be sized such that it has extra capacity and ability to modulate the described operations with varying input parameters.

A collection of exemplary examples, including at least some explicitly enumerated "ECs" (Example Combinations), providing additional description of a variety of example types in accordance with the concepts described herein are provided below. These examples are not meant to be mutually exclusive, exhaustive or restrictive; and the invention is not limited to these example examples but rather encompasses all possible modification and variations within the scope of the issued claims and their equivalents.

EC 1. A method for removing drilling fluid from wet drill cuttings, comprising: at a pressure above atmospheric pressure: combusting a rich air-fuel mixture at a rich combustion temperature, thereby producing a generally low oxygen, inert rich exhaust; providing said rich exhaust to the wet drill cuttings to contact and directly heat the wet drill cuttings by convection so that at least a portion of the drilling fluid is evaporated therefrom and at least some dry solid drill cuttings remain; condensing at least a portion of the evaporated drilling fluid to produce condensed drilling fluid; and separately recovering the condensed drilling fluid and the dry solid drill cuttings.

EC 2. The method of any one of the preceding or subsequent example combinations, wherein the condensing comprises recovering heat from the at least the portion of the evaporated drilling fluid.

EC 3. The method of any one of the preceding or subsequent example combinations further comprising, at the pressure above atmospheric pressure, prior to the combusting of the rich-air fuel mixture, pre-heating combustion air to a pre-heat temperature lower than the rich combustion temperature, thereby producing pre-heated combustion air, and adding fuel to the pre-heated combustion air to produce the rich air-fuel mixture.

EC 4. The method of any one of the preceding or subsequent example combinations further comprising: at the pressure above atmospheric pressure, prior to adding fuel to the pre-heated combustion air to produce the rich air-fuel mixture, combusting at least a portion of the pre-heated combustion air at a pre-heat combustion temperature, thereby producing a pre-heated combustion exhaust, and mixing the pre-heated combustion exhaust with the pre-heated combustion air; wherein the pre-heat combustion temperature is lower than the rich combustion temperature and the pre-heated combustion exhaust is a lean-air fuel mixture.

EC 5. The method of any one of the preceding or subsequent example combinations, wherein the recovered heat is used to pre-heat the combustion air to the pre-heat temperature.

EC 6. The method of any one of the preceding or subsequent example combinations further comprising: sensing an oxygen level of the rich exhaust; and adjusting the amount of fuel or air in the rich air-fuel mixture based on the sensed oxygen level.

EC 7. The method of any one of the preceding or subsequent example combinations further comprising: sensing a carbon monoxide level of the rich exhaust; and adjusting the amount of fuel or air in the rich-air fuel mixture based on the sensed carbon monoxide level.

EC 8. The method of any one of the preceding or subsequent example combinations further comprising: agitating the wet drill cuttings while providing the rich exhaust to the wet drill cuttings.

EC 9. The method of any one of the preceding or subsequent example combinations further comprising: treating the condensed drilling fluid to separate fine solid drill cuttings therefrom; wherein recovering the dry solid drill cuttings comprises recovering the fine solid drill cuttings and the dry solid drill cuttings.

EC 10. The method of any one of the preceding or subsequent example combinations, wherein the treating comprises filtering the condensed drilling fluid.

EC 11. The method of any one of the preceding or subsequent example combinations further comprising: cooling the dry solid drill cuttings.

EC 12. The method of any one of the preceding or subsequent example combinations further comprising: burning off non-condensable gases of the evaporated drilling fluid such that at least some water remains; wherein recovering the condensed drilling fluid comprises recovering the remaining water.

EC 13. The method of any one of the preceding or subsequent example combinations, wherein the fuel is provided by a gaseous fuel source.

EC 14. A system for removing drilling fluid from wet drill cuttings, comprising: a rich combustion chamber having at least one air inlet, at least one fuel inlet, wherein the rich combustion chamber is configured to heat a rich air-fuel mixture at a rich combustion temperature, thereby producing a generally low oxygen, inert rich exhaust; a processor having a processing chamber, the processing chamber having a cuttings inlet through which the wet drill cuttings are received into the processing chamber, an evaporated drilling fluids outlet, a dry drilling solids outlet and an exhaust inlet configured to receive the rich exhaust directly or indirectly from the rich combustion chamber, wherein the processor is configured to provide the rich exhaust to the processing chamber to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom; wherein the rich combustion chamber, the processor and the at least one condensing device operate at a pressure above atmospheric pressure.

EC 15. The system of any one of the preceding or subsequent example combinations, wherein: the at least one condensing device comprises a heat exchanger having at least one heat outlet, the heat exchanger being configured to pre-heat combustion air using heat recovered from the evaporated drilling fluids and to provide the pre-heated combustion air to the rich combustion chamber via the at least one air inlet for combustion.

EC 16. The system of any one of the preceding or subsequent example combinations further comprising: a pre-heat combustion chamber having at least one pre-heat air inlet in fluid communication with the at least one heat outlet and configured to receive at least a portion of the pre-heated combustion air therein, at least one pre-heat fuel inlet in fluid communication with a fuel source and at least one pre-heat exhaust outlet in fluid communication with the at least one air inlet of the rich combustion chamber; wherein the pre-heat combustion chamber is configured to combust a lean air-fuel mixture comprised of the received pre-heated combustion air at a pre-heated combustion temperature, thereby producing a pre-heated combustion exhaust for receipt by the rich combustion chamber via the at least one air inlet; and wherein the pre-heated combustion temperature is lower than the rich combustion temperature.

EC 17. The system of any one of the preceding or subsequent example combinations further comprising: one or more of a rich exhaust oxygen sensor and a rich exhaust carbon monoxide sensor, the rich exhaust oxygen sensor being configured to determine an oxygen level of the rich exhaust prior to receipt by the processing chamber, and the rich exhaust carbon monoxide sensor configured to determine a carbon monoxide level of the rich exhaust prior to receipt by the processing chamber.

EC 18. The system of any one of the preceding or subsequent example combinations further comprising: a controller operatively connected to the fuel inlet and at least one of the rich exhaust oxygen sensor and the rich exhaust carbon monoxide sensor, the controller configured to adjust the fuel-air ratio of the rich fuel-air mixture based on the sensed oxygen level or the sensed carbon monoxide level.

EC 19. The system of any one of the preceding or subsequent example combinations further comprising: a heating device configured to heat combustion air and provide heated combustion air to the rich combustion chamber via the at least one air-inlet.

EC 20. The system of any one of the preceding or subsequent example combinations, wherein the processor is further configured to agitate the wet drill cuttings in the processing chamber while the rich exhaust is being provided thereto.

EC 21. The system of any one of the preceding or subsequent example combinations further comprising: a fine filter in fluid communication with the evaporated drilling fluids outlet and configured to separate fine solid drill cuttings from the evaporated drilling fluids.

EC 22. The system of any one of the preceding or subsequent example combinations further comprising: a solids cooling device configured to receive the dry solid drill cuttings directly or indirectly from the dry solids outlet.

EC 23. The system of any one of the preceding or subsequent example combinations further comprising: a flare stack configured to receive and burn off at least a portion non-condensable gas of the evaporated drilling fluids from the at least one condensing device.

EC 24. The system of any one of the preceding or subsequent example combinations, wherein the at least one condensing device is configured to provide water from the recovered condensed drilling fluid to the solids cooling device.

EC 25. The system of any one of the preceding or subsequent example combinations further comprising: an exhaust heater in fluid communication with the at least one rich exhaust outlet and configured to receive and further heat the rich exhaust received therefrom to a temperature higher than the rich combustion temperature and to provide the further heated rich exhaust, directly or indirectly, to the processing chamber via the exhaust inlet.

EC 26. The system of any one of the preceding or subsequent example combinations further comprising: a natural gas fired engine configured to provide additional air exhaust therefrom directly or indirectly to the processing chamber.

EC 27. The system of any one of the preceding or subsequent example combinations further comprising: a natural gas fired engine configured to provide additional air exhaust therefrom directly or indirectly to the processing chamber; wherein the natural gas fired engine provides power to the exhaust heater.

EC 28. The system of any one of the preceding or subsequent example combinations further comprising: a non-condensable gas carbon monoxide sensor configured to determine a carbon monoxide level of the non-condensable gas.

EC 29. The system of any one of the preceding or subsequent example combinations, wherein the exhaust heater is an electric heater.

EC 30. A processor for removing drilling fluid from wet drill cuttings, comprising: a processing chamber, the processing chamber having a cuttings inlet through which the wet drill cuttings are received into the processing chamber, an evaporated drilling fluids outlet, a dry drilling solids outlet, a process gas inlet configured to receive process gas, a fixed stage comprising a fixed bed in fluid communication with the process gas inlet and configured to receive the process gas therefrom, an agitator stage upstream of and in fluid communication with the fixed bed and configured to receive the process gas therefrom, the agitator stage operatively connected to the cuttings inlet and having a mixing device configured to agitate the wet drill cuttings received therefrom. The processor is configured to: provide the process gas to the fixed bed and the agitator stage, thereby heating the fixed bed and agitator stage so as to heat and agitate the wet drill cuttings so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and wherein the processor operates at a pressure above atmospheric pressure.

EC 31. A system for removing drilling fluid from wet drill cuttings, comprising: a rich combustion chamber having at least one air inlet, at least one fuel inlet, wherein the rich combustion chamber is configured to heat a rich air-fuel mixture at a rich combustion temperature, thereby producing a generally low oxygen, inert rich exhaust; a processor having a processing chamber, the processing chamber having a cuttings inlet through which the wet drill cuttings are received into the processing chamber, an evaporated drilling fluids outlet, a dry drilling solids outlet, an exhaust inlet configured to receive the rich exhaust directly or indirectly from the rich combustion chamber, a fixed stage comprising a fixed bed in fluid communication with the exhaust inlet and configured to receive the rich exhaust therefrom, an agitator stage upstream of and in fluid communication with the fixed bed and configured to receive the rich exhaust therefrom, the agitator stage operatively connected to the cuttings inlet and having a mixing device configured to agitate the wet drill cuttings received therefrom, wherein the processor is configured to provide the rich exhaust to the processing chamber to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom; wherein the rich combustion chamber, the processor and the at least one condensing device operate at a pressure above atmospheric pressure; wherein providing the rich exhaust to the processing chamber to contact and directly heat the wet drill cuttings by convection comprises providing the rich exhaust to the agitator stage via the fixed bed and agitating the wet drill cuttings by the mixing device.

EC 32. The system of any one of the preceding or subsequent example combinations, wherein the mixing device is a mechanical mixing device.

EC 33. The system of any one of the preceding or subsequent example combinations further comprising: a purge system downstream the fixed stage and configured to compel at least a portion of the dry solid drill cuttings for receipt by the dry solids outlet.

EC 34. The system of any one of the preceding example combinations, wherein the fixed stage comprises a heat distribution system configured to distribute the received rich exhaust across at least one heat distribution plane of the agitator stage.

Persons skilled in the art will appreciate that there are yet more alternative implementations and modifications possible, and that the above examples are only illustrations of one or more implementations. The scope, therefore, is only to be limited by the claims appended hereto.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A method for removing drilling fluid from wet drill cuttings, comprising:

combusting a rich air-fuel mixture at a combustion temperature, thereby producing a generally low oxygen, inert exhaust;

providing said exhaust to the wet drill cuttings to contact and directly heat the wet drill cuttings by convection so that at least a portion of the drilling fluid is evaporated therefrom and at least some dry solid drill cuttings remain;

agitating the wet drill cuttings while providing the exhaust to the wet drill cuttings;

condensing at least a portion of the evaporated drilling fluid to produce condensed drilling fluid; and separately recovering the condensed drilling fluid and the dry solid drill cuttings, wherein providing the exhaust to the wet drill cuttings comprises:

(a) providing the exhaust to a fixed bed of a fixed stage configured to receive the exhaust, and (b) providing the exhaust to an agitator stage upstream of and in fluid communication with the fixed bed and configured to receive the exhaust therefrom, the agitator stage having a mechanical mixing device configured to agitate the wet drill cuttings during agitation.

2. The method of claim 1, wherein the condensing comprises:

recovering heat from the at least the portion of the evaporated drilling fluid.

3. The method of claim 1 further comprising:

at a pressure above atmospheric pressure:

prior to the combusting of the rich-air fuel mixture, pre-heating combustion air to a pre-heat temperature lower than the combustion temperature, thereby producing pre-heated combustion air, and adding fuel to the pre-heated combustion air to produce the rich air-fuel mixture.

4. The method of claim 1, wherein:

the condensing comprises recovering heat from the at least the portion of the evaporated drilling fluid; and the recovered heat is used to pre-heat the combustion air to the pre-heat temperature.

5. The method of claim 1 further comprising:

sensing an oxygen level of the exhaust; and adjusting the amount of fuel or air in the rich air-fuel mixture based on the sensed oxygen level.

6. The method of claim 1 further comprising:

sensing a carbon monoxide level of the exhaust; and adjusting the amount of fuel or air in the rich-air fuel mixture based on the sensed carbon monoxide level.

7. A system for removing drilling fluid from wet drill cuttings, comprising:

a rich combustion chamber having at least one air inlet, at least one fuel inlet, wherein the rich combustion chamber is configured to heat a rich air-fuel mixture at a combustion temperature, thereby producing a generally low oxygen, inert exhaust;

a processor having a processing chamber, the processing chamber having a cuttings inlet through which the wet drill cuttings are received into the processing chamber, an evaporated drilling fluids outlet, a dry drilling solids outlet and an exhaust inlet configured to receive the exhaust directly or indirectly from the rich combustion chamber, a fixed stage comprising a fixed bed in fluid communication with the exhaust inlet and configured to receive the exhaust therefrom, an agitator stage upstream of and in fluid communication with the fixed bed and configured to receive the exhaust therefrom, the agitator stage operatively connected to the cuttings inlet and having a mixing device configured to agitate the wet drill cuttings received therefrom, wherein the processor is configured to:

provide the exhaust to the processing chamber to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom;

wherein the rich combustion chamber, the processor and the at least one condensing device operate at a pressure above atmospheric pressure; and wherein the providing of the exhaust to the processing chamber to contact and directly heat the wet drill cuttings by convection comprises providing the exhaust to the agitator stage via the fixed bed and agitating the wet drill cuttings by the mixing device.

8. The system of claim 7, wherein the at least one condensing device comprises a heat exchanger having at least one heat outlet, the heat exchanger being configured to pre-heat combustion air using heat recovered from the evaporated drilling fluids and to provide the pre-heated combustion air to the rich combustion chamber via the at least one air inlet for combustion, and the system further comprises:

a pre-heat combustion chamber having at least one pre-heat air inlet in fluid communication with the at least one heat outlet and configured to receive at least a portion of pre-heated combustion air therein, at least one pre-heat fuel inlet in fluid communication with a fuel source and at least one pre-heat exhaust outlet in fluid communication with the at least one air inlet of the rich combustion chamber;

wherein the pre-heat combustion chamber is configured to combust a lean air-fuel mixture comprised of the received pre-heated combustion air at a pre-heated combustion temperature, thereby producing a pre-heated combustion exhaust for receipt by the rich combustion chamber via the at least one air inlet; and wherein the pre-heated combustion temperature is lower than the rich combustion temperature.

9. The system of claim 7 further comprising:

one or more of a exhaust oxygen sensor and a exhaust carbon monoxide sensor, the exhaust oxygen sensor being configured to determine an oxygen level of the exhaust prior to receipt by the processing chamber, and the exhaust carbon monoxide sensor configured to determine a carbon monoxide level of the exhaust prior to receipt by the processing chamber.

10. The system of claim 9 further comprising a controller operatively connected to the fuel inlet and at least one of the exhaust oxygen sensor and the exhaust carbon monoxide sensor, the controller configured to adjust the fuel-air ratio of the rich fuel-air mixture based on the sensed oxygen level or the sensed carbon monoxide level.

11. The system of claim 7 further comprising:

a heating device configured to heat combustion air and provide heated combustion air to the rich combustion chamber via the at least one air-inlet.

12. The system of claim 7 further comprising:

a natural gas fired engine configured to provide additional air exhaust therefrom directly or indirectly to the processing chamber.

13. The system of claim 7 further comprising:

a natural gas fired engine configured to provide additional air exhaust therefrom directly or indirectly to the processing chamber;

wherein the natural gas fired engine provides power to the exhaust heater.

14. The system of claim 7, wherein the mixing device is a mechanical mixing device.

15. The system of claim 7, further comprising a purge system downstream the fixed stage and configured to compel at least a portion of the dry solid drill cuttings for receipt by the dry solids outlet.

16. The system of claim 7, wherein the fixed stage comprises a heat distribution system configured to distribute the received rich exhaust across at least one heat distribution plane of the agitator stage.

17. A processor for removing drilling fluid from wet drill cuttings, comprising:

a processing chamber, the processing chamber having a cuttings inlet through which the wet drill cuttings are received into the processing chamber, an evaporated drilling fluids outlet, a dry drilling solids outlet, a process gas inlet configured to receive process gas, a fixed stage comprising a fixed bed in fluid communication with the process gas inlet and configured to receive the process gas therefrom, an agitator stage upstream of and in fluid communication with the fixed bed and configured to receive the process gas therefrom, the agitator stage operatively connected to the cuttings inlet and having a mixing device configured to agitate the wet drill cuttings received therefrom, wherein the processor is configured to

21 provide the process gas to the fixed bed and the agitator
stage, thereby heating the fixed bed and agitator
stage so as to heat and agitate the wet drill cuttings
so that at least a portion of drilling fluid is evaporated
therefrom and at least some dry solid drill cuttings
remain, provide evaporated drilling fluid to the evaporated
drilling fluids outlet for recovery therefrom, and provide dry solid drill cuttings to the dry solids outlet
for recovery therefrom; and wherein the processor operates at a pressure above atmo-
spheric pressure.

* * * * *